US009939718B2

(12) United States Patent
Matsumoto

(10) Patent No.: US 9,939,718 B2
(45) Date of Patent: Apr. 10, 2018

(54) LIGHT SOURCE APPARATUS AND PROJECTOR

(71) Applicant: Sony Corporation, Tokyo (JP)

(72) Inventor: Kazuya Matsumoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 357 days.

(21) Appl. No.: 13/928,712

(22) Filed: Jun. 27, 2013

(65) Prior Publication Data

US 2014/0016098 A1 Jan. 16, 2014

(30) Foreign Application Priority Data

Jul. 12, 2012 (JP) ................................. 2012-156184

(51) Int. Cl.
*G03B 21/20* (2006.01)
*G02B 27/28* (2006.01)

(52) U.S. Cl.
CPC ......... *G03B 21/204* (2013.01); *G02B 27/283* (2013.01); *G02B 27/285* (2013.01); *G03B 21/2073* (2013.01)

(58) Field of Classification Search
CPC .. H04N 9/3167; H04N 9/3161; H04N 9/3164; G02B 6/27; G02B 6/2706;
(Continued)

(56) References Cited

U.S. PATENT DOCUMENTS

2008/0247150 A1* 10/2008 Itoh ...................... G02B 6/0028
362/19

2011/0292349 A1* 12/2011 Kitano ................... G03B 21/20
353/31
(Continued)

FOREIGN PATENT DOCUMENTS

| JP | 2011-158502 | 8/2011 |
|----|-------------|--------|
| JP | 2012-3042 | 1/2012 |
| JP | 2012-9242 | 1/2012 |
| JP | 2012-18208 | 1/2012 |
| JP | 2012-123179 | 6/2012 |
| WO | WO 2012/077192 | 6/2012 |

OTHER PUBLICATIONS

Office Action issued in the corresponding Japanese Application No. 2012-156184 dated Dec. 15, 2015 and its English Translation.

*Primary Examiner* — Christina Riddle
*Assistant Examiner* — Christopher Lamb, II
(74) *Attorney, Agent, or Firm* — Haug Partners LLP; William S. Frommer

(57) ABSTRACT

A light source apparatus includes a polarization conversion element, a fluorescent substance and a light source element. The polarization conversion element has a p/s-polarizing beam splitter film to separate polarization components of incident light into p-polarization component and s-polarization component. The fluorescent substance emits visible light as the incident light that is incident on the p/s-polarizing beam splitter film, which visible light is generated by that the fluorescent substance is excited by excitation light, and has a wavelength of longer wavelength region than a wavelength of the excitation light. The light source element emits a laser beam having a predetermined wavelength as the excitation light to irradiate the fluorescent substance with the excitation light so that a laser beam having a polarization plane between the polarization plane of p-polarized light and the polarization plane of s-polarized light exiting from the fluorescent substance is emitted as the incident light.

2 Claims, 11 Drawing Sheets

(58) Field of Classification Search
CPC .... G02B 6/2713; G02B 6/272; G02B 6/2726; G02B 6/2733; G02B 6/274; G02B 6/2746; G02B 6/2753; G02B 6/276; G02B 6/2766; G02B 6/2773; G02B 6/278; G02B 6/2786; G02B 6/2793; G02B 6/0003; G02B 6/29302; G02B 26/00; G02B 27/10; G02B 27/286; G02B 27/283; G02B 27/48; G02B 5/0294; G02B 26/008; G03B 21/2073; G03B 21/2033; G03B 21/204; G03B 21/2013; G03B 21/2006; G03B 21/2046
USPC .................................................. 353/20, 85
See application file for complete search history.

(56) References Cited

U.S. PATENT DOCUMENTS

| | | | | |
|---|---|---|---|---|
| 2012/0002173 | A1* | 1/2012 | Akiyama | G03B 21/2013 353/30 |
| 2012/0019786 | A1* | 1/2012 | Kimura | G03B 21/14 353/31 |
| 2012/0127435 | A1* | 5/2012 | Kitano | G03B 21/204 353/20 |
| 2012/0257171 | A1* | 10/2012 | Song | G03B 21/16 353/52 |
| 2013/0002972 | A1* | 1/2013 | Tanaka | G02B 27/1046 349/8 |
| 2013/0229628 | A1* | 9/2013 | Akiyama et al. | 353/20 |

* cited by examiner

LIGHT SOURCE APPARATUS AND PROJECTOR

BACKGROUND

The present disclosure relates to a light source apparatus and a projector utilizing this light source apparatus.

In recent years, techniques with the use of a laser light source as a light source of a projector have been proposed. Japanese Patent Application Laid-open No. 2012-3042 (hereinafter referred to as Patent Document 1) proposes the way of using laser light, which is coherent light emitted from a laser light source, by scattering the laser light by a scattering element in which a fluorescent material is mixed. In this light source apparatus, while reducing coherency of the laser light to reduce speckle noise in the outgoing light, it is possible to reproduce the color of the image by combining the luminescent colors of both the laser light itself and the fluorescence emitted from the scattering element excited by the laser light (see, for example, paragraph [0018] of Patent Document 1, etc.).

As the light source apparatus of Patent Document 1 uses fluorescence, which is randomly-polarized (as in the state of natural light, with its polarization direction being random) light whose optical loss tends to be large, it is configured to arrange the polarization directions of the fluorescence to be the same direction using a polarization conversion element, in order to enhance the utilization efficiency of light. The polarization conversion element has a polarizing beam splitter, a reflecting mirror and a polarization rotation element. The light that was incident on the polarizing beam splitter is emitted branched into two optical paths, by being isolated into a polarization component in a first polarization direction (p-polarization component) and a polarization component in a second polarization direction orthogonal thereto (s-polarization component). The polarization rotation element provided in one of the two optical paths causes the polarization plane of light to be rotated by 90°. By the reflecting mirror and the like, the two optical paths are directed to an exit surface of the polarization conversion element in parallel. Thus, one light beam incident on the polarizing beam splitter is allowed to be emitted being converted into two light beams having the same single polarization component.

SUMMARY

When the fluorescence, which is the randomly polarized light having no polarization plane in particular, is incident on the polarization conversion element, the fluorescence may be emitted relatively evenly by branching into the two optical paths corresponding to the polarization components. However, in cases where laser light, which is polarized light, is incident on the polarization conversion element, there is a possibility that the light would be emitted unevenly to one of the optical paths, depending on the orientation of the polarization plane. As a result, in a light source plane of the light source apparatus (exit surface of the polarization conversion element), while the colored ray by the fluorescence is evenly distributed, the colored ray by the laser light may not be evenly distributed, and thus distribution of intensity of light becomes uneven depending on the color.

In view of the above-mentioned circumstances, it is desirable to provide a light source apparatus, and a projector, which can reduce non-uniformity of intensity of light of each color.

According to an embodiment of the present disclosure, there is provided a light source apparatus including a polarization conversion element, a fluorescent substance and a light source element.

The polarization conversion element has a p/s-polarizing beam splitter film capable of separating polarization components of incident light into p-polarization component and s-polarization component.

The fluorescent substance is capable of emitting visible light as the incident light that is incident on the p/s-polarizing beam splitter film, which visible light is generated by that the fluorescent substance is excited by excitation light, and has a wavelength of longer wavelength region than a wavelength of the excitation light.

The light source element is capable of emitting a laser beam having a predetermined wavelength as the excitation light to irradiate the fluorescent substance with the excitation light so that a laser beam having a polarization plane between the polarization plane of p-polarized light and the polarization plane of s-polarized light exiting from the fluorescent substance is emitted as the incident light.

With the incidence of the incident light in the state of including both of the p- and s-polarization components, on the p/s-polarizing beam splitter film in the polarization conversion element, the incident light can be emitted branched into the optical path of the p-polarization component and the optical path of the s-polarization component, in the same manner as the visible light of the other color which is randomly polarized light. Therefore, a light source apparatus which can reduce non-uniformity of intensity of light of each color can be obtained.

The light source apparatus may further include a supporting member configured to support the light source element so as to position the polarization plane of the incident light between the polarization plane of p-polarized light and the polarization plane of s-polarized light.

The supporting member supports the light source element in a state where the polarization plane of the laser beam emitted from the light source element is directed to an appropriate direction. This enables to irradiate the p/s-polarizing beam splitter film with the laser beam exited from the fluorescent substance, in the state of including both of the p- and s-polarization components.

The supporting member may support the light source element so that an angle θ of the polarization plane of the incident light relative to an angle of a reference polarization plane being set as 0°, where the reference polarization plane is a polarization plane in which the p-polarization component and the s-polarization component are in a ratio of 1:1, is −20°≤θ≤20°. Desirably, the supporting member supports the light source element so that the polarization plane of the incident light is at an angle substantially equal to the reference polarization plane.

The use of the above-mentioned supporting member allows the polarization plane of the laser beam exited from the fluorescent substance to be positioned at an angle in the angle range where the p- and s-polarization components are nearly equal to each other, and thus can equalize the distribution of intensity of light.

According to another embodiment of the present disclosure, there is provided another light source apparatus including a polarization conversion element, a fluorescent substance a plurality of light source elements and a supporting member.

The polarization conversion element has a p/s-polarizing beam splitter film capable of separating polarization components of an incident light beam into p-polarization component and s-polarization component.

The fluorescent substance is capable of emitting visible light as the incident light beam that is incident on the p/s-polarizing beam splitter film, which visible light is generated by that the fluorescent substance is excited by excitation light, and has a wavelength of longer wavelength region than a wavelength of the excitation light.

Each of the plurality of light source elements is capable of emitting a laser beam having a predetermined wavelength as the excitation light to irradiate the fluorescent substance with the excitation light so that a plurality of laser beams exiting from the fluorescent substance is emitted as a plurality of incident light beams that are incident on the p/s-polarizing beam splitter film.

The supporting member is configured to support the plurality of light source elements so that a direction, as viewed from optical axis direction, of a resultant vector obtained by combining the directions, as viewed from the optical axis direction, of vectors along respective polarization planes of the plurality of incident light beams is positioned between the polarization plane of p-polarized light and the polarization plane of s-polarized light.

In cases where incident light is the plurality of laser beams from the light source elements, if the orientation of the plane of polarization obtainable by combining a plurality of orientations of the plane of polarization (direction of the resultant vector) is between the polarization plane of p-polarized light and the polarization plane of s-polarized light, it is able to irradiate the p/s-polarizing beam splitter film with both of the p- and s-polarization components, as a whole.

The supporting member may be configured to place the plurality of light source elements so that the direction of the resultant vector is directed within ±20°, as viewed from the optical axis direction, with respect to a polarization plane in which the p-polarization component and the s-polarization component are in a ratio of 1:1.

With the orientation of the plane of polarization obtainable by combining a plurality of orientations of the plane of polarization of the plurality of laser beams from the light source elements being directed in the angle range where the p- and s-polarization components are nearly equal to each other, it is able to emit both of the p- and s-polarization components, as a whole, and thus can equalize the distribution of intensity of light.

The plurality of light source elements may include a first light source element capable of emitting a laser beam having a first polarization plane as a first incident light beam out of the plurality of incident light beams, and a second light source element capable of emitting a laser beam having a second polarization plane as a second incident light beam out of the plurality of incident light beams. The supporting member may be configured to place the first light source element and the second light source element so that the first polarization plane and the second polarization plane are perpendicular to each other.

In cases where the orientations of the planes of polarization of the laser beams from two light source elements are perpendicular to each other, one polarization plane of the laser beam and the other polarization plane of the other laser beam have the p- and s-polarization components in their ratios being reversed with each other. Therefore, by adding them together, it can easily equalize the distribution of intensity of light.

According to still another embodiment of the present disclosure, there is provided a projector including at least one light source apparatus of the above and an image generating element configured to generate an image using the light emitted from the light source apparatus.

By applying to the projector the light source apparatus described above, it is able to reduce non-uniformity of each of the display colors in display surface of the image, thereby contributing to the improvement in image quality.

As described above, according to the embodiments of the present disclosure, the non-uniformity of intensity of light of each color, in the light source apparatus, can be reduced.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments of the present disclosure will be described with reference to the drawings.

<First Embodiment>

Figure 1:
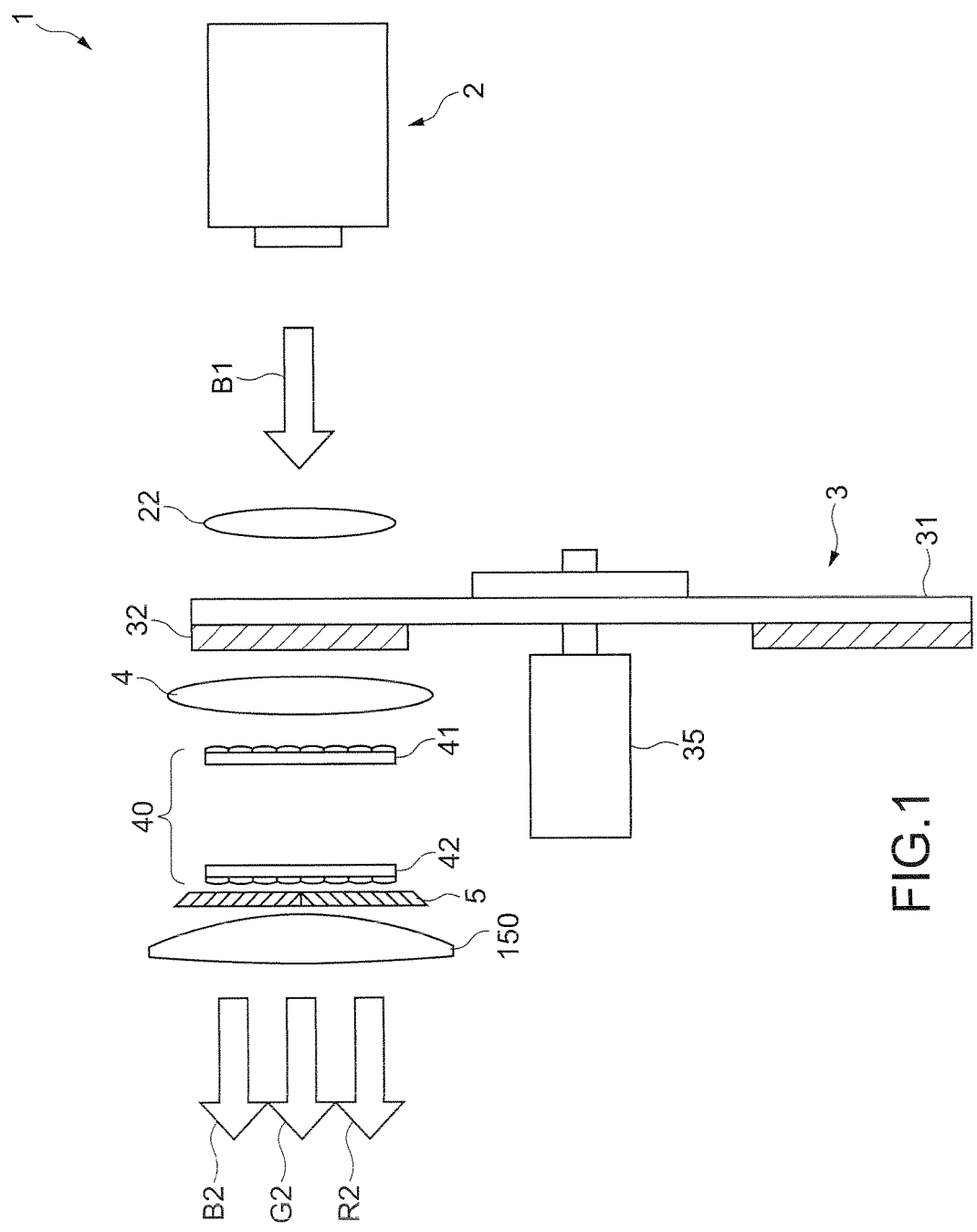
FIG. 1 is a schematic diagram showing a configuration of a light source apparatus according to a first embodiment of the present disclosure.

FIG. 1 is a schematic diagram showing a configuration of a light source apparatus according to a first embodiment of the present disclosure. This light source apparatus 1 is a light source apparatus for a projector of the type which emits white light by combining laser in blue wavelength region with light in the wavelength region of from red to green, which light is generated from a fluorescent substance being excited by this laser.

The light source apparatus 1 includes a laser light source 2, a condenser lens 22, a fluorescent wheel 3, a collimating optical system 4, an integrator element 40, a polarization conversion element 5, and the like.

The laser light source 2 as a light source element is configured to emit a laser beam of a predetermined wavelength region toward the fluorescent wheel 3. An example of the laser light source 2 is a blue laser light source which is capable of laser oscillation to generate a blue laser beam B1 having a peak-wavelength of the light emission intensity peak in a wavelength range from 400 nm to 500 nm.

The condenser lens 22 includes one or more convex lenses. The condenser lens 22 is disposed between the laser light source 2 and the fluorescent wheel 3, on the optical axis of the laser beam emitted from the laser light source 2. The condenser lens 22 collects the blue laser beam B1 emitted from the laser light source 2.

The fluorescent wheel 3 has a substrate 31 in a disc shape which transmits the blue laser beam B1 and a phosphor layer 32 provided on the substrate 31. The fluorescent wheel 3 is disposed in such a manner that a main surface on the side of the substrate 31 which is not provided with the phosphor layer 32, out of two main surfaces of the substrate 31, is facing toward the side of the condenser lens 22. At the center of the substrate 31, a motor 35 for driving the fluorescent wheel 3 is connected. The fluorescent wheel 3 has an axis of rotation 33 at a normal line passing through the center of the substrate 31. The fluorescent wheel 3 is provided to be rotatable about the axis of rotation 33. Further, the fluorescent wheel 3 is disposed in such a manner that the focal position of the blue laser beam B1 being condensed by the condenser lens 22 is coincident to the position of the phosphor layer 32.

The phosphor layer 32 includes a fluorescent substance which can be excited by the blue laser beam B1 as excitation light and generate visible light having a wavelength of longer wavelength region than a wavelength of the excitation light. For example, the phosphor layer 32 includes a substance that emits fluorescence when excited by blue laser light having a center wavelength of about 445 nm, and is configured to convert a part of the blue laser beam B1 emitted from the laser light source 2 into light in the wavelength region including the wavelength region of from red to green (i.e., yellow light), and to emit the converted light. Examples of such fluorescent substances to be used include YAG (yttrium aluminum garnet) fluorescent materials.

Further, by transmitting a part of the excitation light while absorbing a part of the excitation light, the phosphor layer 32 is capable of emitting the blue laser beam B1 emitted from the laser light source 2 as well. As a result, light emitted from the phosphor layer 32 becomes white light by color mixing of the blue excitation light and the yellow fluorescence. In order to transmit a part of the excitation light in this way, the phosphor layer 32 may include filler particles which are a particulate material having optical transparency, for example.

By that the substrate 31 is rotated by the motor 35, the laser light source 2 is allowed to irradiate the phosphor layer 32 with the excitation light while relatively moving the irradiation position on the phosphor layer 32. Thus, while avoiding degradation due to irradiation for a long period of time with the excitation light at the same position, the fluorescent wheel 3 enables to obtain the blue laser beam B1 from the laser light source 2, and to obtain the fluorescence resulting from conversion thereof.

The collimating optical system 4 includes one or more convex lenses. The collimating optical system 4 collimates the light from the fluorescent wheel 3 and irradiates the integrator element 40 with the collimated light.

The integrator element 40 includes a first fly-eye lens 41 which has a plurality of microlenses provided in a two-dimensional array, and a second fly-eye lens 42 which has a plurality of microlenses that are arranged so as to correspond one by one to the microlenses of the first fly-eye lens 41. The collimated light incident on the integrator element 40, from the collimating optical system 4, is divided into a plurality of light beams by the microlenses of the first fly-eye lens 41. Each of the light beams is imaged on the corresponding one of the microlenses in the second fly-eye lens 42. Each of the microlenses of the second fly-eye lens 42 serves as a secondary light source, and can irradiate the polarization conversion element 5 with a plurality of collimated light beams of almost equal luminance, as the incident light.

As a whole, the collimating optical system 4 and the integrator element 40 have a function to arrange the incident light irradiated on the polarization conversion element 5 from the laser light source 2 and the fluorescent wheel 3, equalizing luminance distribution of the incident light.

The polarization conversion element 5 has a function to arrange the polarization state of the incident light that is emitted from the laser light source 2 and the fluorescent wheel 3, and is incident on the polarization conversion element 5 through the integrator element 40 and the like. This polarization conversion element 5 is configured to emit outgoing light which includes a blue laser beam B2, a green light beam G2 and a red light beam R2, for example, through a superimposing lens 150 and the like disposed on the exit side of the light source apparatus 1.

Figure 2:
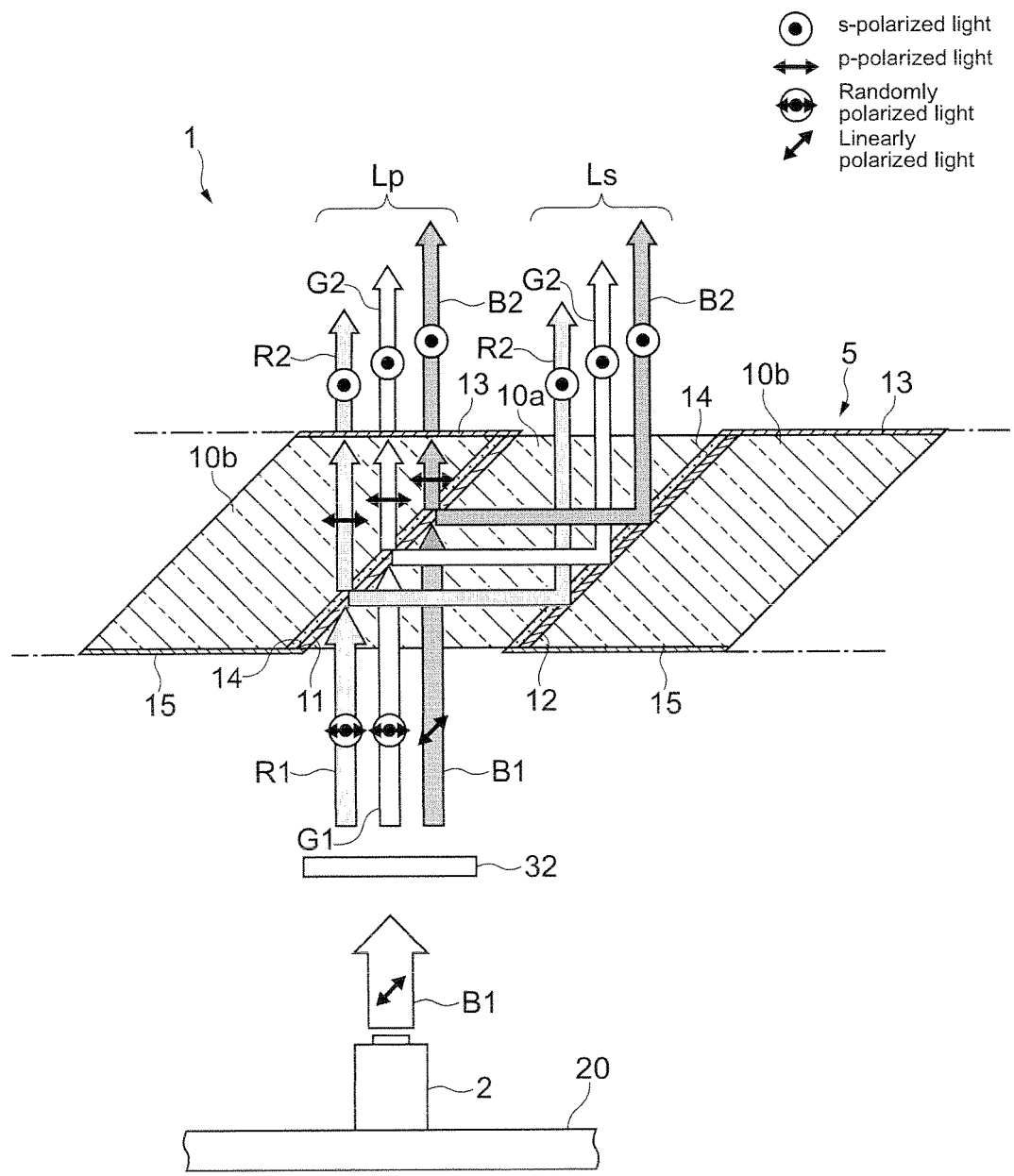
FIG. 2 is a diagram schematically showing polarization state of light in FIG. 1.

FIG. 2 is a diagram schematically showing polarization state of light in FIG. 1. It can be assumed that substantially the condenser lens 22, the collimating optical system 4, the integrator element 40 and the like do not significantly affect the polarization state of the light. Therefore, illustration and description thereof will be omitted in the following.

Typically, the polarization conversion element 5 has an outer shape of a rectangle as viewed from optical axis direction. With reference to FIG. 2, the polarization conversion element 5 includes a plurality of substrates 10a and a plurality of substrates 10b, each having a strip-like shape extending in the direction perpendicular to the plane of FIG. 2. These substrates 10a and 10b are disposed alternately arranged, and are adhered to each other by an adhesive layer 14. There is a p/s-polarizing beam splitter film 11 provided between the substrate 10a and the substrate 10b of the left side in the drawing. There is a total reflection film 12 provided between the substrate 10a and the substrate 10b of the right side in the drawing.

Each of the substrate 10a and the substrate 10b is a transparent substrate made of a material such as glass, which is, as shown in FIG. 2, having a parallelogram shape in which one pair of opposite angles is about 45° and the other is about 135°, for example. The polarization conversion element 5 may be one produced in the following manner. For example, a plurality of glass substrates is prepared. To each one of some of the glass substrates (substrates 10a), the p/s-polarizing beam splitter film 11 is deposited on a main surface thereof. To each one of the rest of the glass substrates (substrates 10b), the total reflection film 12 is deposited on a main surface thereof. After bonding of these substrates 10a, 10b, 10a, 10b . . . , the stacked substrates are cut at an angle of 45° to the main surface to provide the polarization conversion element 5. The cut surfaces become the respective ones of an incident side end surface and an exit side end surface of the light. An example of the thickness of each of these substrates is 2 mm to 4 mm.

Each substrate 10b is provided with a retardation film 13 on the exit side end surface of the light, in the polarization conversion element 5. Further, each substrate 10b is provided with a light shielding film 15 on the incident side end surface of the light, in the polarization conversion element 5. While the incident side of the light of the substrate 10b is provided with the light shielding film 15, the incident side of the light of the substrate 10a is not provided with the light shielding film 15.

By having the light shielding film 15 disposed at the incident side end surfaces of the substrates 10b, it allows the incident light from the phosphor layer 32 to enter the polarization conversion element 5 from the end surfaces of the substrates 10a. Since the p/s-polarizing beam splitter film 11 is disposed to be directed in a diagonal direction to the incident side end surface of the substrate 10a, the incident light is incident in the diagonal direction on the p/s-polarizing beam splitter film 11.

The p/s-polarizing beam splitter film 11 is the so-called "PBS (Polarizing Beam Splitter)", and is formed with a dielectric multilayer film. The p/s-polarizing beam splitter film 11 has a function to separate polarization components of the incident light into p-polarization component and s-polarization component. The p/s-polarizing beam splitter film 11 allows transmission of the p-polarization component having a polarization plane parallel to the "plane of incidence (plane that includes optical axes of incident light and of reflected light)", and reflects the s-polarization component having a polarization plane orthogonal to the plane of incidence.

The total reflection film 12 is a mirror which is formed with a metal film such as aluminum, or a dielectric multilayer film. The total reflection film 12 allows an optical path of s-polarized light to be parallel to an optical path of the light that has been transmitted through the p/s-polarizing beam splitter film 11 (p-polarized light), by reflecting the light that has been reflected by the p/s-polarizing beam splitter film 11 to be incident on the total reflection film 12 (s-polarized light).

The retardation film 13 has a function of a half-wave plate, which has a function to rotate the polarization direction of the incident light by 90°. Thus, the p-polarized light that has been transmitted through the p/s-polarizing beam splitter film 11 to be incident on the retardation film 13 is emitted, being converted into s-polarized light, by the retardation film 13.

As a whole, the polarization conversion element 5 is configured to convert the p-polarization component included in the light emitted from the phosphor layer 32 into the s-polarized light to be emitted from the substrates 10b, and to maintain the s-polarization component included in the light emitted from the phosphor layer 32 as the s-polarized light to be emitted from the substrates 10a next to the substrates 10b.

Here, the polarization components included in the light emitted from the phosphor layer 32 will be described.

As shown in FIG. 2, the light emitted from the phosphor layer 32 includes a green light beam G1 and a red light beam R1 as the fluorescence, and a part of the blue laser beam B1 which is the excitation light from the laser light source 2.

The red light beam R1 and the green light beam G1, which are fluorescence, are randomly polarized light having no polarization plane in particular and include both the p-polarization component and s-polarization component. Therefore, each of the red light beam R1 and the green light beam G1 can be separated into p-polarization component and s-polarization component by the p/s-polarizing beam splitter film 11. In the case of randomly polarized light, as a ratio of such polarization components is relatively even, the outgoing light is emitted branched into the optical path of the s-polarized light (optical path Ls of the substrate 10a side) and the optical path of the p-polarized light (optical path Lp of the substrate 10b side) in half the amount of light each (outgoing light beams R2 and G2 in FIG. 2).

On the other hand, the blue laser beam B1 is a linearly polarized light being in the state of maintaining the polarization plane of the blue laser beam B1 irradiated as excitation light. Because of this, the ratio of the polarization components in the blue laser beam B1 incident on the p/s-polarizing beam splitter film 11 is determined by the orientation of the polarization plane of the blue laser beam B1 emitted from the laser light source 2.

As shown in FIG. 2, the light source apparatus 1 is provided with a supporting substrate 20 as a supporting member to support the laser light source 2. The supporting substrate 20 may be a circuit board, for example. The supporting substrate 20 supports the laser light source 2 so as to position the polarization plane of the blue laser beam B1 between the polarization plane of p-polarized light and the polarization plane of s-polarized light. Specifically, the orientation of the polarization plane of the blue laser beam B1 can be determined by an orientation the laser light source 2 is disposed. In particular, it can be determined by a rotational angle position around the optical axis, based on orientations of the p-polarization plane and the s-polarization plane that are determined according to the p/s-polarizing beam splitter film 11.

Figure 3:
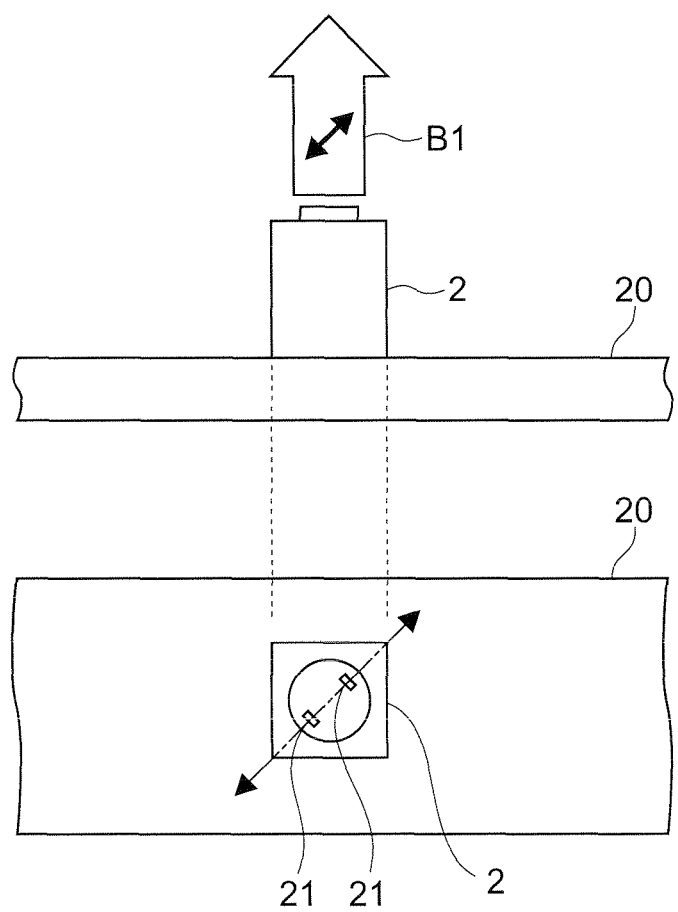
FIG. 3 is a diagram showing the laser light source in FIG. 2.

FIG. 3 is a diagram showing the laser light source 2. The upper part of FIG. 3 is a side view of the laser light source 2 and the supporting substrate 20 as viewed from the same direction as FIG. 2. The lower part of FIG. 3 is a front view of them as viewed from the optical axis direction. The laser light source 2 has a pair of electrodes 21, for example. For example, if the direction in which these electrodes 21 are aligned (direction of the arrow indicated by a chain line) is consistent with the plane of polarization of the linearly polarized laser light emitted by this laser light source 2, the laser light source 2 may be mounted to the supporting substrate 20 in such a manner that the alignment direction of these electrodes 21 is positioned between the orientations of the p-polarization plane and the s-polarization plane.

Figure 4:
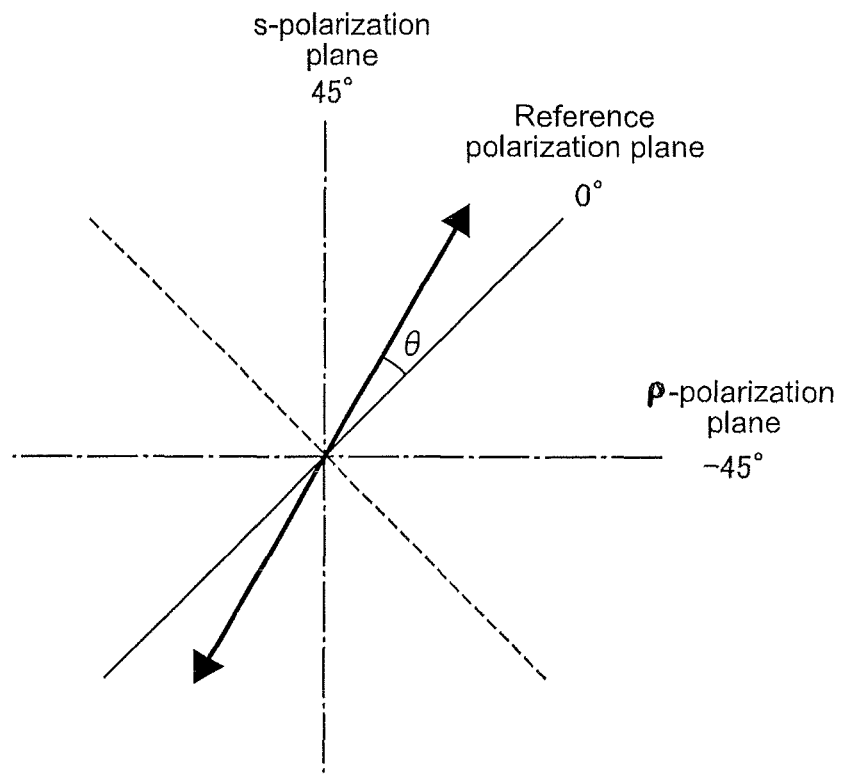
FIG. 4 is a diagram illustrating a polarization plane of the incident laser beam.

For example, the laser light source 2 is disposed in an orientation such that the polarization plane of the blue laser beam B1 is close to a "reference polarization plane", where the reference polarization plane is a polarization plane in which the p-polarization component and the s-polarization component are in a ratio of 1:1. FIG. 4 is a diagram for illustrating a polarization plane of the incident laser beam. As shown in FIG. 4, an angle of the s-polarization plane and an angle of the p-polarization plane may be represented by 45° and −45° respectively, when an angle of the reference polarization plane is set as 0°.

Specifically, the supporting substrate 20 may support the laser light source 2 in such a manner that an angle θ of the polarization plane of the blue laser beam B1 is −20°≤θ≤20°. In the polarization plane by such an angle θ, each of the p-polarization component and s-polarization component is in the range of about 30% to 70%. Thus, non-uniformity in quantity between these polarization components can be reduced.

The most desirable angle θ of the polarization plane would be the angle equal to that of the reference polarization plane. In other words, light polarized at 45°, which is at the median of the angles of p-polarized light and s-polarized light being in a right angle, is desirable.

For example, as described above, the blue laser beam B1 which has the polarization plane coincident with the reference polarization plane is separated into p-polarization component and s-polarization component by the p/s-polarizing beam splitter film 11. The p-polarization component of the blue laser beam B1 is transmitted through the p/s-polarizing beam splitter film 11 as the p-polarized light, then converted into the s-polarized light by the retardation film 13, and is emitted. The amount of light reflected by the p/s-polarizing beam splitter film 11 and the amount of light transmitted are substantially the same. The s-polarization component of the blue laser beam B1 is reflected by the p/s-polarizing beam splitter film 11 and the total reflection film 12, and is emitted, from the area not provided with the retardation film 13 of the exit side, as the s-polarized light.

Thus, blue laser beam B1 which is polarized light can also be emitted branched into the optical path Lp of the p-polarization component and the optical path Ls of the s-polarization component, in the same manner as the visible light of the other color which is randomly polarized light. With the polarization plane of the incident light (B1), as the most desirable angle θ, being coincident with the reference polarization plane, it can reduce non-uniformity of the amount of light between the blue laser beams B2 branched into the optical paths left and right.

Figure 5:
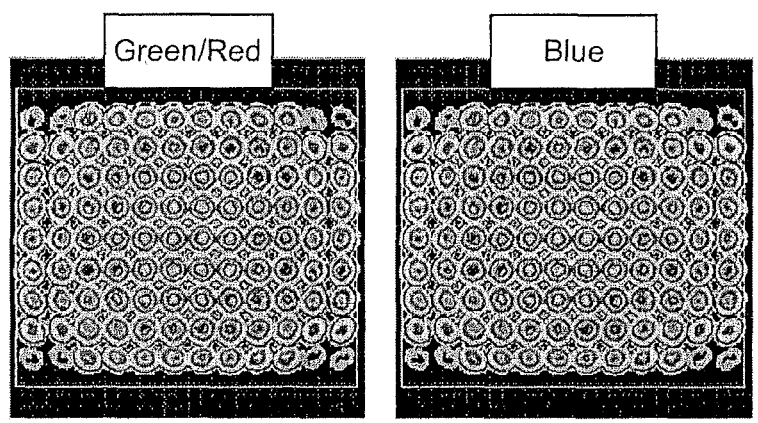
FIG. 5 is a diagram illustrating distribution of intensity of light at an exit surface of a polarization conversion element by the light source apparatus.

FIG. 5 is a diagram illustrating distribution of intensity of outgoing light at the exit side end surface of the polarization conversion element 5 by the light source apparatus 1. As the result of the above, the blue laser beams B2 are distributed in almost the same uniformity as in the red light beams R2 and in the green light beams G2.

COMPARATIVE EXAMPLE 1

Figure 6:
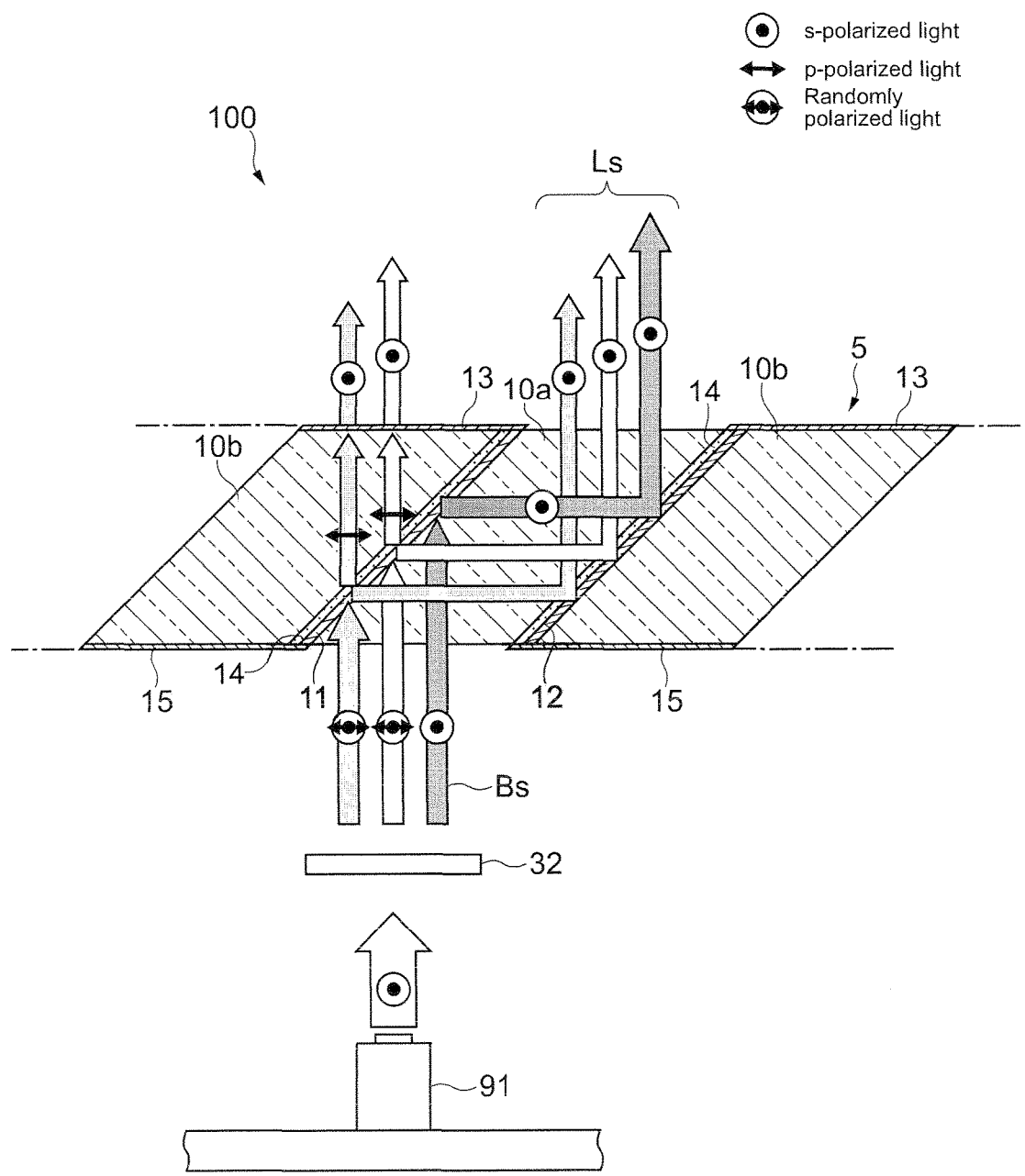
FIG. 6 is a diagram showing a light source apparatus according to a first comparative example.

FIG. 6 schematically shows a light source apparatus according to a first comparative example for comparison of the light source apparatus 1 according to the first embodiment. Parts similar to the above embodiment are denoted by the same reference numerals.

This light source apparatus 100 according to the first comparative example is a light source apparatus that utilizes laser light as blue light and utilizes fluorescence as color lights of longer wavelength region than blue (red light and green light), in the same manner as light source apparatus 1. The light source apparatus 100 includes the same polarization conversion element 5 as in the light source apparatus 1 shown in FIG. 2. However, unlike the light source apparatus 1, a laser light source 91 is disposed so as to irradiate the polarization conversion element 5 with s-polarized light as the incident light. A blue laser beam Bs which is s-polarized light is all reflected by the p/s-polarizing beam splitter film 11 to be incident on the total reflection film 12, and is emitted at the optical path Ls of the s-polarized light side (right side). In this case, blue laser light is not emitted at the optical path Lp of the p-polarized light side (left side).

Figure 7:
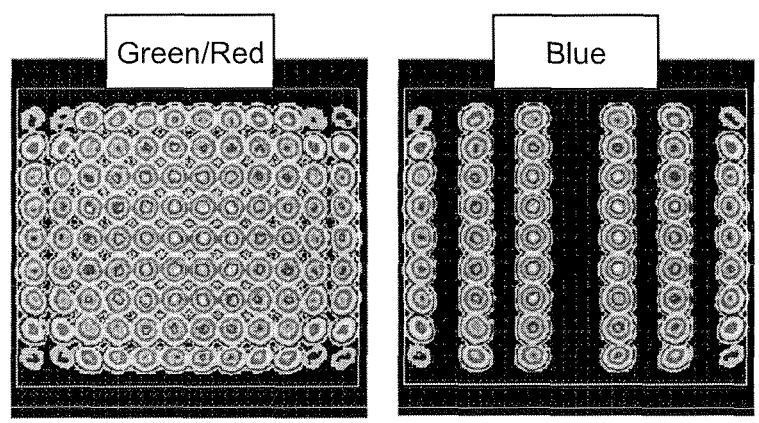
FIG. 7 is a diagram showing distribution of intensity of light at an exit surface of the polarization conversion element shown in FIG. 6.

FIG. 7 shows distribution of intensity of outgoing light at the exit side end surface of the polarization conversion element 5 of this light source apparatus 100. In this light source apparatus 100, since the outgoing blue laser light is emitted unevenly to one of the optical paths, the distribution of intensity of blue light at the exit surface becomes significantly uneven, and such uniformity as red light and green light is hardly obtained. This leads to a problem that the white light to be emitted becomes uneven.

COMPARATIVE EXAMPLE 2

Figure 8:
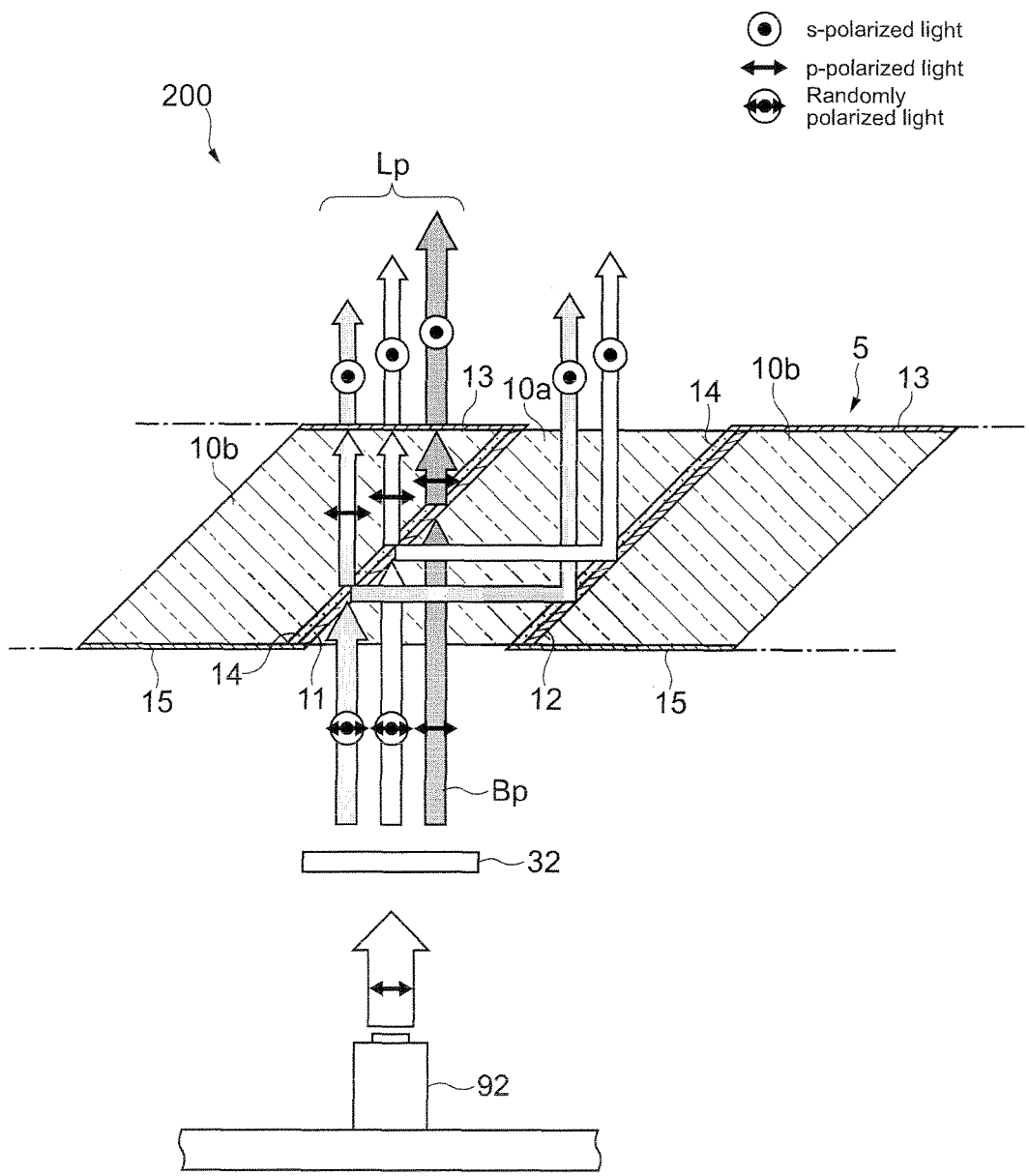
FIG. 8 is a diagram showing a light source apparatus according to a second comparative example.
Figure 9:
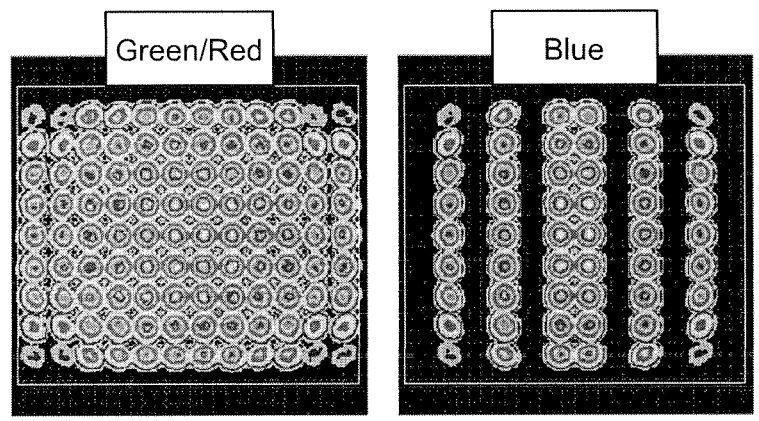
FIG. 9 is a diagram showing distribution of intensity of light at an exit surface of the polarization conversion element shown in FIG. 8.

FIG. 8 schematically shows a light source apparatus according to a second comparative example. FIG. 9 shows distribution of intensity of outgoing light at the exit side end surface of the polarization conversion element 5 of this light source apparatus 200. In this second comparative example, a laser light source 92 is disposed so as to irradiate the polarization conversion element 5 with p-polarized light as the incident light. In this case, a blue laser beam Bp which is p-polarized light is all transmitted through the p/s-polarizing beam splitter film 11 to be incident on the retardation film 13 and is converted into the s-polarized light. Thus, blue laser light is all emitted at the optical path Lp of the left side, and is not emitted at the s-polarized light side (right side). As a result, as shown in FIG. 9, the distribution of intensity of blue light at the exit surface becomes significantly uneven as compared to red light and green light, and the white light becomes uneven.

COMPARATIVE EXAMPLE 3

Figure 10:
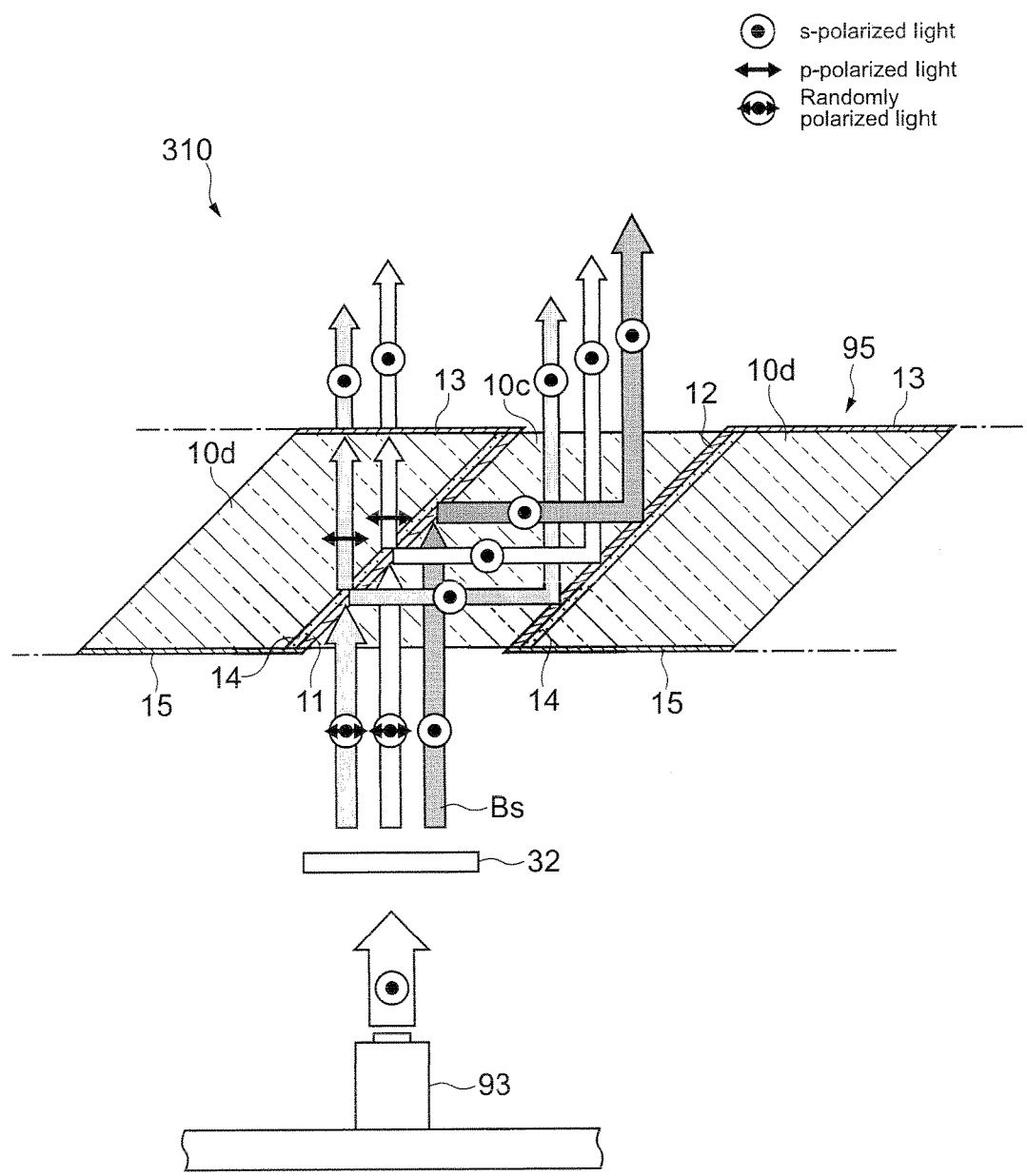
FIG. 10 is a diagram showing a light source apparatus according to a third comparative example.
Figure 11:
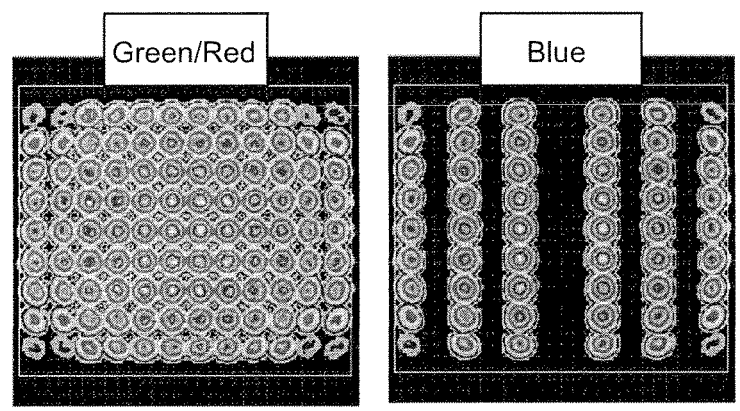
FIG. 11 is a diagram showing distribution of intensity of light at an exit surface of the polarization conversion element shown in FIG. 10.

FIG. 10 schematically shows a light source apparatus according to a third comparative example. FIG. 11 shows distribution of intensity of outgoing light at the exit side end surface of the polarization conversion element 95 of this light source apparatus 310. In this case, the positions of the total reflection film 12 provided on the polarization conversion element 95 and the adhesive layer 14 adjacent thereto are reversed with each other, as compared to the above-described polarization conversion element 5. That is, the total reflection film 12 is formed on each substrate 10c, and the adhesive layer 14 is provided between this total reflection film 12 and a substrate 10d in the right side in the drawing.

A laser light source 93 is disposed so as to irradiate the polarization conversion element 95 with s-polarized light as the incident light. In the light source apparatus 310 according to the third comparative example, the entire blue laser beam Bs as the incident light is reflected by the p/s-polarizing beam splitter film 11 to be incident on the total reflection film 12, in the same manner as the first comparative example (see FIG. 6).

As has been seen in FIG. 6, in the light source apparatus 100, the blue laser beam Bs enters the total reflection film 12 after passing through the adhesive layer 14, and is reflected by the total reflection film 12 to go through the adhesive layer 14 again. When the amount of the blue laser beam Bs passing through the adhesive layer 14 becomes larger, there is a concern that the adhesive layer 14 may deteriorate. The light source apparatus 310 shown in FIG. 10 allows the blue laser beam Bs to be totally reflected by the total reflection film 12 without passing through the adhesive layer 14, and thus can avoid photo-deterioration of the adhesive layer 14. However, as shown in FIG. 11, there is still a problem that the distribution of intensity of blue light at the exit surface of the polarization conversion element 95 is uneven.

With the light source apparatus 1 according to the above-described first embodiment, the amount of s-polarization component that enters the adhesive layer 14 on the total reflection film 12 can be reduced down to half the amount of the blue laser beam B1 incident on the p/s-polarizing beam splitter film 11. This enables to suppress the deterioration of the adhesive layer 14 due to light as well.

From such a point of view of preventing the deterioration of the adhesive layer 14 due to light, it is also possible that in the light source apparatus 1, the polarization conversion element 95 of the light source apparatus 310 is employed instead of the polarization conversion element 5.

However, in producing this polarization conversion element 95, it is necessary to form the total reflection film 12 on the surface of the opposite side of the substrate 10c which has the p/s-polarizing beam splitter film 11 formed on one side thereof. In other words, there is still a problem that it takes more production process because it is necessary to form films on both sides of a substrate.

While the light source apparatus 1 uses the polarization conversion element 5 which can be produced by relatively simple process, the light source apparatus 1 is also able to suppress deterioration of the adhesive layer 14, by reducing the amount of laser light passing each adhesive layer 14. Therefore, it can avoid decrease in reliability of the polarization conversion element without increasing the production cost.

<Second Embodiment>

Figure 12:
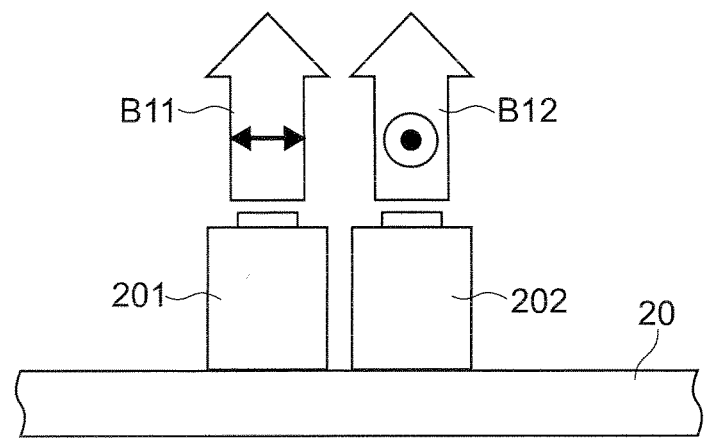
FIG. 12 is a diagram schematically showing a light source apparatus according to a second embodiment of the present disclosure, and the polarization state of light by the light source apparatus.
Figure 12:
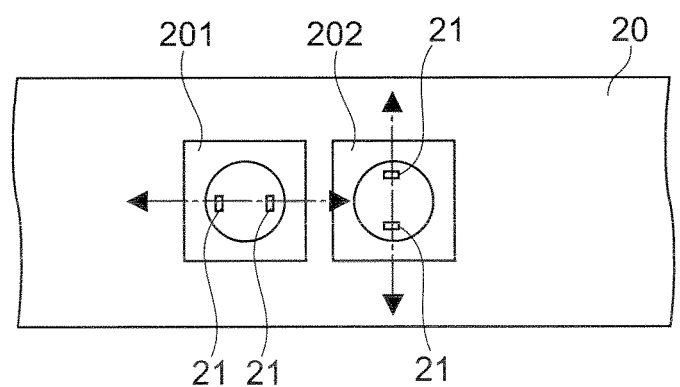

FIG. 12 is a diagram showing laser light sources in a light source apparatus according to a second embodiment of the present disclosure. In this embodiment, description of the members, features and the like, which are substantially the same as those included in the light source apparatus 1 according to the first embodiment will be simplified or omitted, and the differences will be mainly described.

This light source apparatus has a plurality of light source elements, which includes laser light sources 201 and 202. The plurality of light source elements may be a laser array made up with many laser light sources 201 and 202, including the laser light sources 201 as many as the laser light sources 202, for example.

The laser light source 201 (first light source element) mounted to the supporting substrate 20 in a predetermined orientation so as to irradiate the phosphor layer 32 and the p/s-polarizing beam splitter film 11 with a blue laser beam B11 (first incident light beam) having a first polarization plane. The laser light source 202 (second light source element) is mounted to the supporting substrate 20 in an orientation such that it is capable of emitting a blue laser beam B12 (second incident light beam) having a polarization plane (second polarization plane) that differs in orientation from the first polarization plane, as a counterpart to the laser light source 201.

Specifically, as shown in FIG. 12, the laser light source 201 and the laser light source 202 which are substantially the same elements are supported by the supporting substrate 20 in such a manner that the rotational angle position around the optical axis of each of the laser light sources 201 and 202 is shifted from each other. For example, by setting the difference between the rotational angle positions to 90°, the first polarization plane and the second polarization plane of a plurality of laser beams incident on the p/s-polarizing beam splitter film 11 can be perpendicular to each other.

In FIG. 12, the laser light source 201 is disposed so as to emit the blue laser beam B11 having the polarization plane of p-polarized light, and the laser light source 202 is disposed so as to emit the blue laser beam B12 having the polarization plane of s-polarized light. The laser light sources 201 and 202 can irradiate the p/s-polarizing beam splitter film 11 with both of the p- and s-polarization components. Therefore, the blue laser beam B2 can be emitted at both of the p-polarization component's optical path Lp and the s-polarization component's optical path Ls (see FIG. 2), and thus non-uniformity of outgoing light beams can be reduced.

<Projector>

Figure 13:
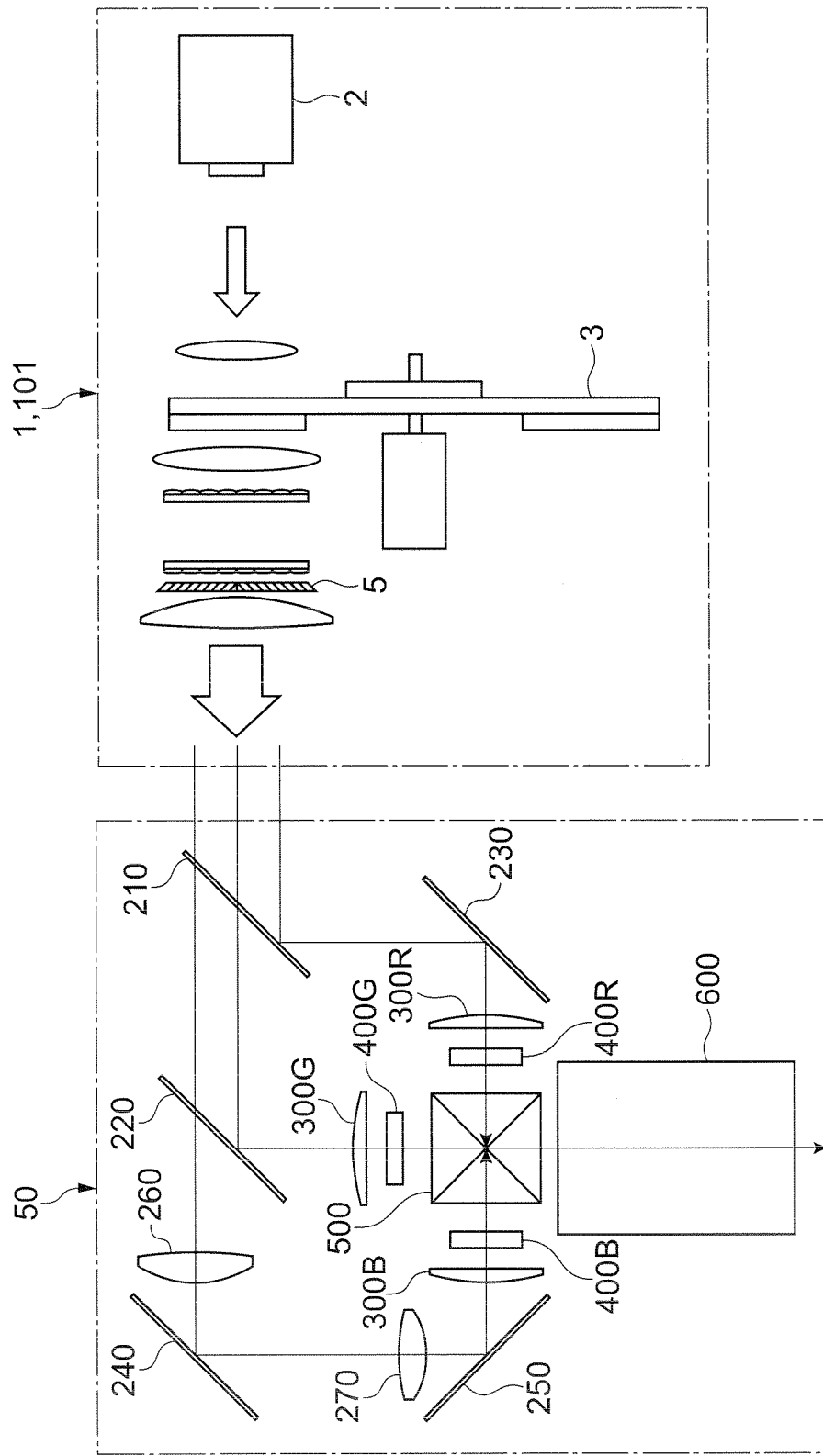
FIG. 13 is a schematic diagram showing a configuration of a projector using a light source apparatus.

FIG. 13 is a schematic diagram showing a projector 100 in which the light source apparatus shown in FIG. 1 or 12 can be installed. The projector 100 has an optical engine 50 to utilize the light emitted from the light source apparatus.

The optical engine 50 includes dichroic mirrors 210 and 220, mirrors 230, 240 and 250, relay lenses 260 and 270, field lenses 300R, 300G and 300B; and as an image generating element, liquid crystal light valves 400R, 400G and 400B, a dichroic prism 500 and a projection optical system 600.

The dichroic mirrors 210 and 220 have properties to selectively reflect a color light of a predetermined wavelength region and transmit the light of other wavelength regions. With reference to FIG. 12, for example, the dichroic Mirror 210 selectively reflects the red light beam R2. The dichroic mirror 220 reflects the green light beam G2 selectively from the green light beam G2 and the blue laser beam (blue light beam) B2 that have been transmitted through the dichroic mirror 210. The remaining blue light beam B2 is transmitted through the dichroic mirror 210. As a result, light emitted from the light source apparatus 1 is separated into a plurality of color lights in different colors.

The separated red light beam R2 is reflected by the mirror 230, and collimated by passing through the field lens 300R, and then it enters the liquid crystal light valve 400R for modulation of red light. The green light beam G2 is collimated by passing through the field lens 300G, and then it enters the liquid crystal light valve 400G for modulation of green light. The blue light beam B2 passes through the relay lens 260 and is reflected by the mirror 240. It further passes through the relay lens 270 and is reflected by the mirror 250. The blue light beam B2 that has been reflected by the mirror 250 is collimated by passing through the field lens 300B, and then it enters the liquid crystal light valve 400B for modulation of blue light.

The liquid crystal light valves 400R, 400G and 400B are electrically connected with a signal source (e.g., PC or the like) (not shown) for supplying image signals including image information. The liquid crystal light valves 400R, 400G and 400B respectively generate a red image, a green image and a blue image, by modulating the incident light for each pixel, on the basis of the image signal of each color to be supplied. The modulated color lights (formed images) are incident on the dichroic prism 500 and are combined. The dichroic prism 500 combines by superimposing the respective color lights being incident from three directions, and emits the combined light to the projection optical system 600. The projection optical system 600 irradiates a screen (not shown) with the light combined by the dichroic prism 500. As a result, a full-color image is displayed.

As the distribution of intensity at the exit surface of each color light supplied to the optical engine 50 is made uniform by the light source apparatus 1, this projector 100 can reduce variations in color when combining a blue image of laser with red and green images of fluorescence. Therefore, it is able to reduce non-uniformity of each of the display colors in display surface of the image, and contribute to the improvement in image quality.

<Other Embodiments>

In cases where a plurality of laser light sources, as in the above-described second embodiment, is provided, the orientations of the two different polarization planes of the blue laser beams B11 and B12 are not limited to the above example. For example, either one or both of these polarization planes may be positioned between the polarization plane of p-polarized light and the polarization plane of s-polarized light.

In cases where the plurality of laser light sources is provided, the orientations of the polarization planes of the plurality of blue laser beams are not limited to two directions. For example, the plurality of laser light sources may be disposed in such a manner that the plurality of blue laser beams includes three or more blue laser beams having their respective polarization planes in different orientations. This allows the plurality of blue laser beams having different polarization planes to be incident on the p/s-polarizing beam splitter film 11, and thus the incident light may surely include the p-polarization component and the s-polarization component. Therefore, the same effect as described above can be obtained.

In such cases, the plurality of laser light sources may be supported by a supporting substrate in such a manner that a direction of a resultant vector obtained by combining the directions, as viewed from the optical axis direction of the plurality of laser light sources, of vectors along respective polarization planes by the laser light sources is positioned between the polarization plane of p-polarized light and the polarization plane of s-polarized light. In particular, an angle θ1 of the resultant vector, when the reference polarization plane is set as 0°, is desirable to be within the range of −20°≤θ1≤20°. The most desirable embodiment is one in which the angle θ1 is substantially equal to the reference polarization plane 0°.

The above-described desirable embodiment regarding the angle θ (and θ1) was −20°≤θ2≤20°, and this may also be −15°≤θ≤15°, −10°≤θ≤10°, or −5°≤θ≤5°.

In the above embodiments, blue laser light was employed as the excitation light to excite the phosphor layer. However, this is not limited thereto, but laser light in blue violet to violet may be employed as the excitation light as well. In such cases, the fluorescent substance material may be selected appropriately depending on the wavelength region of the laser light in blue violet to violet (for example, center wavelength of 405 nm, 420 nm, etc.).

In the above embodiments, examples in which the laser light source is installed on the supporting substrate 20 in such a manner that the angle of the polarization plane is configured were described. However, instead of such an installation angle of the laser light source, it may have a configuration in which the angle of the polarization plane by the laser light source is set by an element to arrange a polarization plane into a predetermined angle. For example, such an element may include an element to convert the light emitted from the laser light source into randomly polarized light; and an element to extract the light having a polarization plane in a predetermined orientation from the randomly polarized light.

At least two characteristic parts out of the characteristic parts of the above embodiments can be combined.

The present disclosure can take the following configurations.

(1) A light source apparatus, including:

a polarization conversion element having a p/s-polarizing beam splitter film capable of separating polarization components of incident light into p-polarization component and s-polarization component;

a fluorescent substance capable of emitting visible light as the incident light that is incident on the p/s-polarizing beam splitter film, which visible light is generated by that the fluorescent substance is excited by excitation light, and has a wavelength of longer wavelength region than a wavelength of the excitation light; and a light source element capable of emitting a laser beam having a predetermined wavelength as the excitation light to irradiate the fluorescent substance with the excitation light so that a laser beam having a polarization plane between the polarization plane of p-polarized light and the polarization plane of s-polarized light exiting from the fluorescent substance is emitted as the incident light.

(2) The light source apparatus according to (1), further including:

a supporting member configured to support the light source element so as to position the polarization plane of the incident light between the polarization plane of p-polarized light and the polarization plane of s-polarized light.

(3) The light source apparatus according to (2), in which the supporting member is configured to support the light source element so that an angle θ of the polarization plane of the incident light relative to an angle of a reference polarization plane being set as 0°, where the reference polarization plane is a polarization plane in which the p-polarization component and the s-polarization component are in a ratio of 1:1, is −20°≤θ≤20°.

(4) The light source apparatus according to (3), in which the supporting member is configured to support the light source element so that the polarization plane of the incident light is at an angle substantially equal to the reference polarization plane.

(5) A light source apparatus, including:

a polarization conversion element having a p/s-polarizing beam splitter film capable of separating polarization components of an incident light beam into p-polarization component and s-polarization component;

a fluorescent substance capable of emitting visible light as the incident light beam that is incident on the p/s-polarizing beam splitter film, which visible light is generated by that the fluorescent substance is excited by excitation light, and has a wavelength of longer wavelength region than a wavelength of the excitation light;

a plurality of light source elements, each of which is capable of emitting a laser beam having a predetermined wavelength as the excitation light to irradiate the fluorescent substance with the excitation light so that a plurality of laser beams exiting from the fluorescent substance is emitted as a plurality of incident light beams that are incident on the p/s-polarizing beam splitter film; and a supporting member configured to support the plurality of light source elements so that a direction, as viewed from optical axis direction, of a resultant vector obtained by combining the directions, as viewed from the optical axis direction, of vectors along respective polarization planes of the plurality of incident light beams is positioned between the polarization plane of p-polarized light and the polarization plane of s-polarized light.

(6) The light source apparatus according to (5), in which the supporting member is configured to place the plurality of light source elements so that the direction of the resultant vector is directed within ±20°, as viewed from the optical axis direction, with respect to a polarization plane in which the p-polarization component and the s-polarization component are in a ratio of 1:1.

(7) The light source apparatus according to (6), in which
the plurality of light source elements includes
a first light source element capable of emitting a laser beam having a first polarization plane as a first incident light beam out of the plurality of incident light beams, and
a second light source element capable of emitting a laser beam having a second polarization plane as a second incident light beam out of the plurality of incident light beams, and
the supporting member is configured to place the first light source element and the second light source element so that the first polarization plane and the second polarization plane are perpendicular to each other.

(8) A projector including:
a light source apparatus which includes
a polarization conversion element having a p/s-polarizing beam splitter film capable of separating polarization components of incident light into p-polarization component and s-polarization component;
a fluorescent substance capable of being excited by excitation light to emit visible light as the incident light that is incident on the p/s-polarizing beam splitter film; and
a light source element capable of
emitting a laser beam having a predetermined wavelength of blue wavelength region or shorter wavelength region and
irradiating the fluorescent substance with the excitation light so that a blue laser beam having a polarization component between the polarization plane of p-polarized light and the polarization plane of s-polarized light is emitted as the incident light that is incident on the p/s-polarizing beam splitter film; and
an image generating element configured to generate an image using the light emitted from the light source apparatus.

(9) A projector including:
a light source apparatus which includes
a polarization conversion element having a p/s-polarizing beam splitter film capable of separating polarization components of an incident light beam into polarization component and s-polarization component;
a fluorescent substance capable of emitting visible light as the incident light beam that is incident on the p/s-polarizing beam splitter film, which visible light is generated by that the fluorescent substance is excited by excitation light, and has a wavelength of longer wavelength region than a wavelength of the excitation light;
a plurality of light source elements, each of which is capable of emitting a laser beam having a predetermined wavelength as the excitation light to irradiate the fluorescent substance with the excitation light so that a plurality of laser beams exiting from the fluorescent substance is emitted as a plurality of incident light beams that are incident on the p/s-polarizing beam splitter film; and
a supporting member configured to support the plurality of light source elements so that a direction, as viewed from optical axis direction, of a resultant vector obtained by combining the directions, as viewed from the optical axis direction, of vectors along respective polarization planes of the plurality of incident light beams is positioned between the polarization plane of p-polarized light and the polarization plane of s-polarized light; and
an image generating element configured to generate an image using the light emitted from the light source apparatus.

The present disclosure contains subject matter related to that disclosed in Japanese Priority Patent Application JP 2012-156184 filed in the Japan Patent Office on Jul. 12, 2012, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A light source apparatus for emitting visible light of uniform intensity, comprising:
a polarization conversion element having a p/s-polarizing beam splitter film capable of separating polarization components of incident light into p-polarization components and s-polarization components for transmission in a transmit direction by transmitting the p-polarization components or the s-polarization components of the incident light in the transmit direction and reflecting the other polarization components in a reflecting direction and re-reflecting the reflected components to transmit the re-reflected components in the same direction as the transmit direction;
a fluorescent substance capable of emitting visible light having p-polarization components and s-polarization components as the incident light that is incident on the p/s-polarizing beam splitter film by exciting the fluorescent substance with excitation light of a predetermined wavelength, the emitted visible light having a wavelength in a wavelength region longer than the wavelength of the excitation light;
a light source element capable of emitting a laser beam with p-polarization components and s-polarization components, the laser beam having the predetermined wavelength as the excitation light to irradiate the fluorescent substance, the laser beam having a polarization plane and at least a part of the laser beam being emitted from the fluorescent substance and incident on the p/s-polarizing beam splitter film with a ratio of the polarization components of the incident laser beam determined by an angle θ of the polarization plane at which the laser beam is emitted, wherein θ is the angle between the polarization plane of the emitted laser beam and a reference polarization plane, wherein the reference polarization plane is between the polarization plane of the p- polarization components and the polarization plane of the s- polarization components emitted from the fluorescent substance; and
a supporting member configured to support the light source element so that the angle θ between the polarization plane of the laser beam emitted by the light source element and the reference polarization plane is −20°≤θ≤20°, and the reference polarization plane is a polarization plane in which the p-polarization component of the light emitted from the fluorescent substance and the s-polarization component of the light emitted from the fluorescent substance are in a ratio of 1:1.

2. A projector comprising:
a light source apparatus for emitting light of uniform intensity and which includes
a polarization conversion element having a p/s-polarizing beam splitter film capable of separating polarization components of incident light into p-polarization components and s-polarization components for transmission in a transmit direction by transmitting the p-polarization components or the s-polarization components of the incident light in the transmit direction and reflecting the other polarization components in a reflecting direction and re-reflecting the reflected components to transmit the re-reflected components in the same direction as the transmit direction;

a fluorescent substance capable of being excited with excitation light to emit visible light having p-polarization components and s-polarization components as the incident light; and a light source element capable of emitting as the excitation light a laser beam with p-polarization components and s-polarization components, the laser beam having a predetermined wavelength in the blue wavelength region or in a shorter wavelength region and irradiating the fluorescent substance with the excitation light so that a laser beam having a polarization plane between the polarization plane of p-polarized light and the polarization plane of s-polarized light is emitted as the excitation light and at least a part of the laser beam is emitted from the fluorescent substance and incident on the p/s-polarizing beam splitter film with a ratio of the p-polarization components to the s-polarization components of the incident laser beam determined by an angle $\theta$ of the polarization plane at which the laser beam is emitted, wherein $\theta$ is the angle between the polarization plane of the emitted laser beam and a reference polarization plane, wherein the reference polarization plane is between the polarization plane of the p-polarization component and the polarization plane of the s-polarization component emitted from the fluorescent substance; a supporting member configured to support the light source element so that the angle $\theta$ between the polarization plane of the laser beam emitted by the light source element and the reference polarization plane is $-20° \leq \theta \leq 20°$; and the reference polarization plane is a polarization plane in which the p-polarization component of the light emitted from the fluorescent substance and the s-polarization component of the light emitted from the fluorescent substance are in a ratio of 1:1; and an image generating element configured to generate an image using the light emitted from the light source apparatus.

* * * * *